(12) United States Patent
Yamashita et al.

(10) Patent No.: US 12,116,063 B2
(45) Date of Patent: Oct. 15, 2024

(54) STEERING SYSTEM

(71) Applicants: TOYOTA JIDOSHA KABUSHIKI KAISHA, Toyota (JP); JTEKT Corporation, Kariya (JP); DENSO CORPORATION, Kariya (JP)

(72) Inventors: Masaharu Yamashita, Toyota (JP); Masataka Okuda, Toyota (JP); Yosuke Yamashita, Nagoya (JP); Yuji Fujita, Okazaki (JP); Yuuta Kajisawa, Okazaki (JP); Kenichi Abe, Okazaki (JP); Hiroki Tomizawa, Kariya (JP); Nobuyori Nakajima, Kariya (JP)

(73) Assignees: TOYOTA JIDOSHA KABUSHIKI KAISHA, Toytoa (JP); JTEKT CORPORATION, Kariya (JP); DENSO CORPORATION, Kariya (JP)

(*) Notice: Subject to any disclaimer, the term of this patent is extended or adjusted under 35 U.S.C. 154(b) by 323 days.

(21) Appl. No.: 17/713,403

(22) Filed: Apr. 5, 2022

(65) Prior Publication Data
US 2022/0332368 A1 Oct. 20, 2022

(30) Foreign Application Priority Data
Apr. 14, 2021 (JP) .................. 2021-068667

(51) Int. Cl.
*B62D 6/02* (2006.01)
*B62D 5/04* (2006.01)
*B62D 6/00* (2006.01)

(52) U.S. Cl.
CPC ............. *B62D 6/02* (2013.01); *B62D 5/0484* (2013.01); *B62D 5/0496* (2013.01); *B62D 6/008* (2013.01)

(58) Field of Classification Search
CPC ...................................................... B62D 5/005
See application file for complete search history.

(56) References Cited

U.S. PATENT DOCUMENTS

| 2004/0211618 | A1  | 10/2004 | Ogawa et al. |
| 2019/0016378 | A1* | 1/2019  | Itou .................. H02P 29/0241 |
| 2019/0233001 | A1* | 8/2019  | Namikawa ............ B62D 5/001 |
| 2023/0159091 | A1* | 5/2023  | Numakura ......... B62D 15/0285 |
|              |     |         | 701/41 |

FOREIGN PATENT DOCUMENTS

| JP | 6-72349 A    | 3/1994 |
| JP | 2004-322715 A | 11/2004 |
| JP | 2018-95198 A | 6/2018 |

\* cited by examiner

*Primary Examiner* — Jaime Figueroa
*Assistant Examiner* — Jerrod Irvin Davis
(74) *Attorney, Agent, or Firm* — Sughrue Mion, PLLC

(57) ABSTRACT

A steer-by-wire steering system for a vehicle, including: an operating member operable by a driver; a steering device including an electric motor and configured to steer a wheel by a force generated by the electric motor; a controller configured to control the steering device, wherein the controller enables the wheel to be steered in accordance with an operation of the operating member while imposing limitation on a supply current to the electric motor, and wherein the limitation imposed on the supply current is made smaller when a running speed of the vehicle is lower than a set speed and a steering motion of the wheel is a motion in a direction to decrease a steering amount than i) when the running speed of the vehicle is not lower than the set speed and ii) when the steering motion of the wheel is a motion in a direction to increase the steering amount.

10 Claims, 8 Drawing Sheets

FIG.3A
| LIMITATION RATIO $\varepsilon$ | | $0 < \alpha < \beta$ |
|---|---|---|
| | VEHICLE SPEED $v < v0$ | VEHICLE SPEED $v \geq v0$ |
| STEERING-ANGLE INCREASING MOTION | $\alpha$ | $\beta$ |
| STEERING-ANGLE KEEPING STATE | $\alpha$ | $\beta$ |
| STEERING-ANGLE DECREASING MOTION | 0 | $\beta$ |
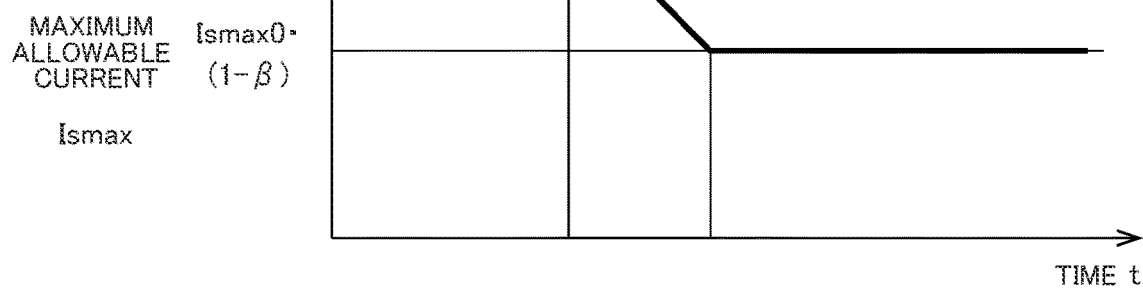
FIG.3B
MAXIMUM ALLOWABLE CURRENT Ismax
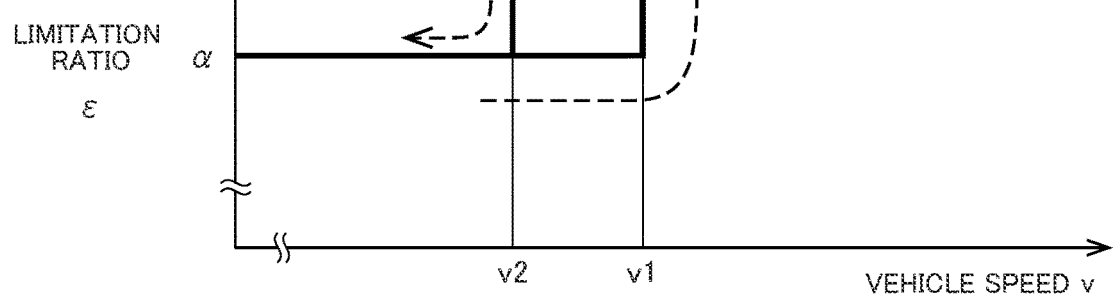
FIG.3C
LIMITATION RATIO $\varepsilon$

STEERING SYSTEM

CROSS REFERENCE TO RELATED APPLICATION

The present application claims priority to Japanese Patent Application No. 2021-068667, which was filed on Apr. 14, 2021, the disclosure of which is herein incorporated by reference in its entirety.

BACKGROUND

Technical Field

The following disclosure relates to a steer-by-wire steering system for vehicles.

Description of Related Art

A typical steer-by-wire steering system is configured such that a wheel is steered by a steering force generated by an electric motor of a steering device (hereinafter referred to as "steering motor" where appropriate) without depending on an operation force applied by a driver to an operating member such as a steering wheel. It is desirable not to impose an excessively large load on the steering motor. In a steering system disclosed in Patent Document 1 (Japanese Patent Application Publication No. 2004-322715), a supply current to the steering motor is limited when a temperature of the steering device becomes higher than or equal to a predetermined temperature.

SUMMARY

In view of the load on the steering motor, the supply current to the steering motor is desirably limited not after the temperature of the steering device rises to the predetermined temperature but before the temperature reaches the predetermined temperature. On the other hand, if the supply current is limited all the time, the steering system cannot exhibit its capability to a sufficient extent, and the driver may have an unnatural feeling with respect to a behavior of the vehicle. That is, there remains much room for improvements in limiting the supply current to the steering motor in the steer-by-wire steering system. By making some modifications, the utility of the steer-by-wire steering system can be enhanced. Accordingly, an aspect of the present disclosure is directed to a steer-by-wire steering system with high utility.

In one aspect of the present disclosure, a steer-by-wire steering system for a vehicle includes:
an operating member operable by a driver;
a steering device including an electric motor and configured to steer a wheel by a force generated by the electric motor;
a controller configured to control the steering device,
wherein the controller enables the wheel to be steered in accordance with an operation of the operating member while imposing limitation on a supply current to the electric motor, and
wherein the limitation imposed on the supply current to the electric motor is made smaller when a running speed of the vehicle is lower than a set speed and a steering motion of the wheel is a motion in a direction to decrease a steering amount than i) when the running speed of the vehicle is not lower than the set speed and ii) when the steering motion of the wheel is a motion in a direction to increase the steering amount.

In the steering system of the present disclosure, the limitation imposed on the current supplied to the electric motor (steering motor) is made small when the motion of the wheel in the direction to decrease the steering amount, i.e., what is called steering-angle decreasing motion, is being performed in a state in which a running speed of the vehicle is low. This configuration enables the steering system to exhibit its capability to a sufficient extent while reducing a load on the electric motor. In the following explanation, the current supplied to the electric motor will be referred to as "steering current", and the running speed of the vehicle will be referred to as "vehicle speed".

Various Forms

The set speed in the present disclosure is desirably determined to be a considerably low speed at which the steering motion, which is a motion called stationary steering, is identified to be performed. Specifically, the set speed is desirably determined to be not lower than 0.5 km/h and not higher than 5 km/h. In a state in which the vehicle speed is lower than the thus determined set speed, it is desirable that the steering motor generate a comparatively large force to overcome a frictional force between a road surface on which the vehicle is traveling and a tire of the wheel. It is accordingly desirable that the limitation imposed on the supply current to the electric motor be comparatively made small. Conversely, in a state in which the vehicle speed is higher than or equal to the set speed, the steering motor is not required to generate a large force. It is accordingly desirable that the limitation imposed on the supply current to the steering motor be made larger in the state in which the vehicle speed is higher than or equal to the set speed than in the state in which the vehicle speed is lower than the set speed. Even if the limitation is made large in such a state, a smooth steering motion can be performed.

The steering amount may be considered as a steering angle of the wheel from a neutral position, for instance. The steering motion of the wheel in the direction to decrease the steering amount may be referred to as "steering-angle decreasing motion", and the steering motion of the wheel in the direction to increase the steering amount may be referred to as "steering-angle increasing motion". In a case where the steering-angle increasing motion is switched to the steering-angle decreasing motion in what is called stationary steering state, it may be understood that an excessively large load is not applied to the steering motor at an initial stage of the steering-angle decreasing motion owing to action of a force to restore deformation of the tire. In contrast, in a case where the steering-angle increasing motion is performed in a state in which the vehicle is running at a certain speed and the steering-angle increasing motion is then switched to the steering-angle decreasing motion just when the vehicle speed becomes lower than the set vehicle speed, the force to restore deformation of the tire is not substantially generated. In this case, the steering-angle decreasing motion cannot be sufficiently performed unless a comparatively large current is supplied to the electric motor. If the steering-angle decreasing motion cannot be sufficiently performed, the driver has a considerable unnatural feeling, unlike a case in which the steering-angle increasing motion cannot be sufficiently performed. In view of this, it is desirable that the limitation imposed on the supply current to the electric motor be made considerably small when the steering-angle decreasing motion is performed in the stationary steering state.

The current supplied to the electric motor may be limited in the following manner. For instance, the supply current may be limited by reducing a maximum allowable current.

Alternatively, the supply current may be limited by subtracting a set ratio of the supply current from the supply current on which no limitation is imposed, and the limitation may be increased by increasing the ratio.

The concept that the limitation imposed on the current supplied to the electric motor is made small includes a concept that no limitation is imposed on the supply current, namely, a concept that the supply current is not limited at all. In the steering system according to the present disclosure, the degree of the limitation imposed on the current supplied to the electric motor may be changed in three or more steps as follows, for instance. When the vehicle speed is lower than the set speed and the steering motion of the wheel is the steering-angle decreasing motion, the limitation imposed on the supply current to the electric motor may be the smallest, in other words, no limitation is imposed on the supply current. When the vehicle speed is lower than the set speed and the steering motion is not the steering-angle decreasing motion, the limitation may be increased to a certain degree. When the vehicle speed is not lower than the set speed, the limitation may be further increased irrespective of whether the steering motion is the steering-angle increasing motion.

When the vehicle speed is lower than the set speed and the steering motion of the wheel is the motion to decrease the steering amount, the supply current may be limited over an entire range of the steering motion. In such a case, however, the supply current may be limited only when the steering amount of the wheel is greater than or equal to a set ratio with respect to a maximum steering amount (that is the steering amount at a steering end). Here, the steering amount at the steering end is defined as 100%. In a case where the steering amount is greater than or equal to 40-60% of the steering amount at the steering end, the limitation on the supply current to the electric motor may be made small.

In a case where the state, in which the vehicle speed is lower than the set speed and the steering motion of the wheel is the motion to decrease the steering amount, continues for a relatively long length of time, there may be a possibility of some failure. In view of this, when the supply current to the electric motor is kept higher than or equal to a set current for not less than a set length of time in such a state, it is desirable to reduce the supply current. Further, when an integrated value of the supply current to the electric motor is not less than a threshold integrated value in such a state or when the temperature of the electric motor is high in such a state, it is desirable to reduce the supply current to the electric motor. Specifically, when the temperature of the controller (such as the temperature of a board of a drive circuit) is not lower than a threshold temperature, it is desirable to reduce the supply current to the electric motor.

In the steering system according to the present disclosure, the degree of the limitation imposed on the supply current to the electric motor is changed depending on whether the vehicle speed is higher than or lower than the set speed. In a state in which the vehicle speed is close to the set speed, therefore, there may occur a phenomenon in which the degree of the limitation is frequently changed, that is, there may occur a hunting phenomenon in control. Thus, the set speed when the running speed of the vehicle is increasing and the set speed when the running speed of the vehicle is decreasing are desirably made different from each other. Specifically, it is desirable that the set speed when the running speed of the vehicle is increasing be higher than that when the running speed of the vehicle is decreasing.

When the degree of the limitation on the supply current to the electric motor is changed, the supply current changes abruptly if the change of the degree of the limitation is abrupt. In such a case, the steering force may change abruptly. To avoid such an abrupt change, when the degree of the limitation on the supply current to the electric motor is changed, namely, when the degree is switched from one to another, it is desirable to continuously change the degree.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 3A is a table illustrating a limitation ratio of a supply current to a steering motor;

FIG. 3B is a graph schematically illustrating a change in a maximum allowable current when a degree of limitation on the supply current is changed;

FIG. 3C is a graph schematically illustrating switchover of the limitation ratio that is caused by a change in a vehicle speed;

DETAILED DESCRIPTION OF THE EMBODIMENT

Figure 1:
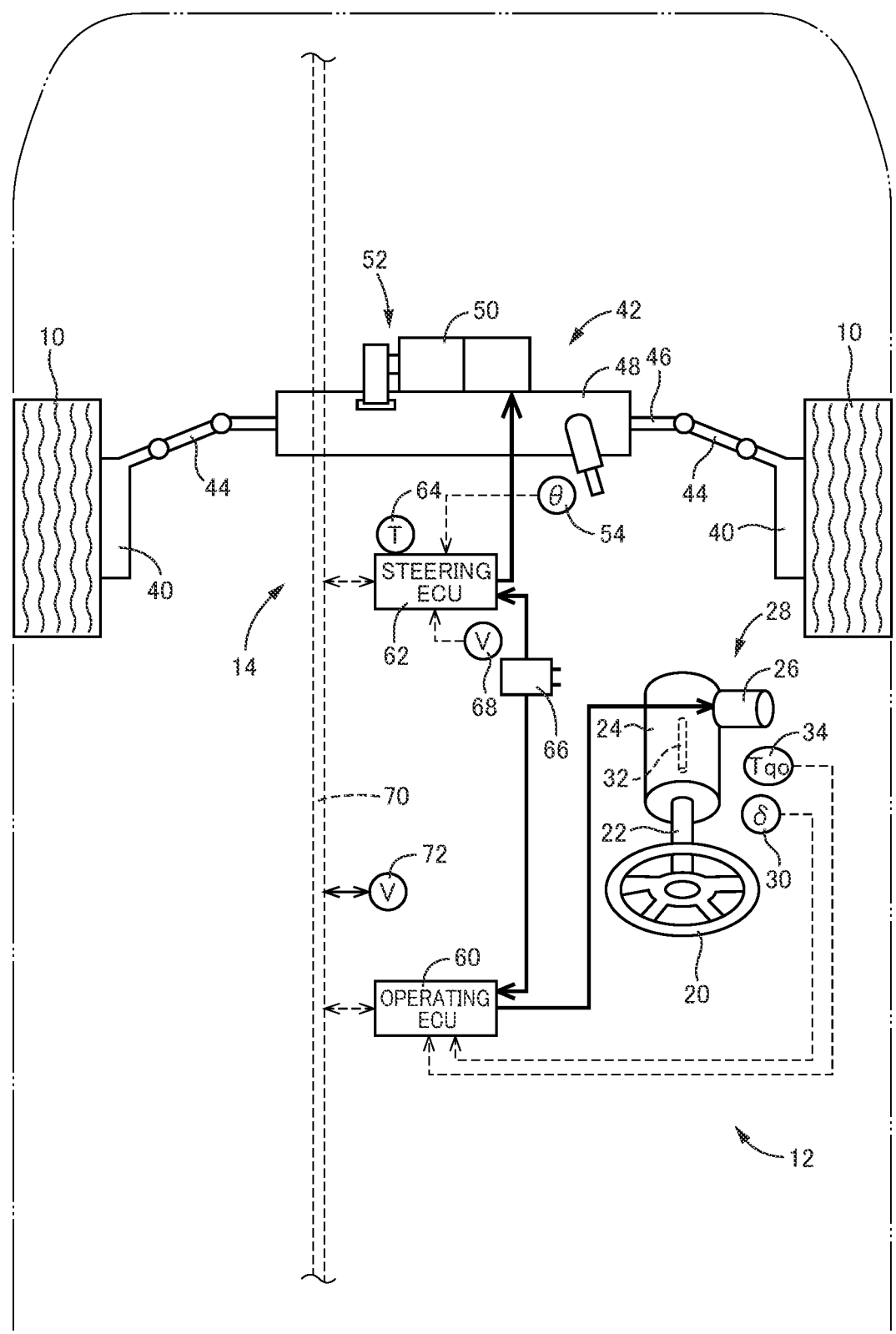
FIG. 1 is a view schematically illustrating an overall configuration of a steering system according to one embodiment.

Referring to the drawings, there will be explained below in detail a steering system according to one embodiment of the present disclosure. It is to be understood that the present disclosure is not limited to the details of the following embodiment, but may be embodied based on the forms described in Various Forms and may be changed and modified based on the knowledge of those skilled in the art.

A. Hardware Configuration of Steering System

As schematically illustrated in FIG. 1, a steering system according to the present embodiment is installed on a vehicle to steer right and left wheels 10. The two wheels 10 are steerable wheels. The present steering system is of steer-by-wire type, i.e., a steer-by-wire steering system, including an operating device 12 and a steering device 14 that are mechanically independent of each other.

The operating device 12 includes a) a steering wheel 20 (as one example of a steering operating member) operable by a driver, b) a steering shaft 22 to one end of which is attached the steering wheel 20, c) a steering column 24 that rotatably holds the steering shaft 22 and that is supported by an instrument panel reinforcement (not illustrated), and d) a reaction-force applying mechanism 28 that utilizes, as a power source, a reaction force motor 26 (that is an electric motor supported by the steering column 24) for applying a reaction force torque Tqc to the steering wheel 20 via the steering shaft 22. The reaction force torque Tqc is an operation reaction force that is a reaction force with respect to a steering operation. The reaction-force applying mechanism 28 has an ordinary structure including a speed reducer, etc., and a detailed explanation thereof is dispensed with. The reaction-force applying mechanism 28 functions as an operation reaction force applying device.

The operating device 12 includes an operation angle sensor 30 for detecting an operation angle δ of the steering wheel 20 as a steering operation amount. Here, a posture of the steering wheel 20 in a straight running state of the vehicle is defined as a neutral posture. In this case, a rotation angle of the steering wheel 20 from the neutral posture is the operation angle δ of the steering wheel 20. A torsion bar 32 is incorporated in the steering shaft 22. The operating device 12 includes an operation torque sensor 34 for detecting an operation torque Tqo based on a torsional amount of the torsion bar 32. The operation torque Tqo is an operation force applied to the steering wheel 20 by the driver.

The wheels 10 are supported by a body of the vehicle via respective steering knuckles 40 such that the wheels 10 are steerable or turnable. The steering device 14 rotates the two steering knuckles 40 to thereby steer the wheels 10 together. The steering device 14 includes a steering actuator 42 as a main constituent element. The steering actuator 42 includes a) a steering rod (generally called a rack bar) 46 whose opposite ends are connected to the right and left steering knuckles 40 via respective link rods 44, b) a housing 48 fixedly supported by the vehicle body and movably supporting the steering rod 46 in the right-left direction, and c) a rod moving mechanism 52 that utilizes, as a drive source, a steering motor 50 (that is an electric motor) for moving the steering rod 46 in the right-left direction. The rod moving mechanism 52 is constituted principally by a ball screw mechanism including a ball groove formed in the steering rod 46 and a nut that is engaged with the ball groove via bearing balls and that is rotated by the steering motor 50. The rod moving mechanism 52 has an ordinary structure, and a detailed explanation thereof is dispensed with.

The steering device 14 includes a steering angle sensor 54 that detects an amount of movement of the steering rod 46 from its neutral position (that is a position of the steering rod 46 in the straight running state of the vehicle) to thereby detect a steering angle θ as an amount of steering of the wheel 10, i.e., a steering amount.

Control of the operating device 12, namely, control of the reaction force torque Tqc, namely, control of the reaction force motor 26 of the operating device 12, is executed by an operating electronic control unit 60 (hereinafter referred to as "operating ECU 60" where appropriate) as an operating controller that is a controller for the operating device 12. The operating ECU 60 is constituted by a computer including a CPU, a ROM, a RAM, etc., and a drive circuit for the reaction force motor 26, for instance. Specifically, the drive circuit is an inverter because the reaction force motor 26 is a three-phase brushless motor.

Likewise, control of the steering device 14, namely, control of the steering angle θ, namely, control of the steering motor 50 of the steering device 14, is executed by a steering electronic control unit 62 (hereinafter referred to as "steering ECU 62" where appropriate) as a steering controller that is a controller for the steering device 14. The steering ECU 62 is constituted by a computer including a CPU, a ROM, a RAM, etc., and a drive circuit for the steering motor 50, for instance. Specifically, the drive circuit is an inverter because the steering motor 50 is a three-phase brushless motor. The steering ECU 62 includes a temperature sensor 64 for detecting a temperature T of the drive circuit. In a strict sense, the temperature T of the drive circuit is a temperature of a board of the drive circuit. Accordingly, the temperature T will be hereinafter referred to as "board temperature T" where appropriate.

The vehicle in the present embodiment is equipped with: a battery 66 as a power source for supplying a current to the steering motor 50 and the reaction force motor 26; and a voltage sensor 68 for detecting a voltage V of the battery 66 as a source voltage. The voltage sensor 68 is connected to the steering ECU 62.

As later explained in detail, the operating ECU 60 and the steering ECU 62 execute respective control processing while transmitting and receiving information to and from each other. To this end, the operating ECU 60 and the steering ECU 62 are connected to a CAN (car area network or controllable area network) 70 as a communication line. The vehicle is equipped with a vehicle speed sensor 72 for detecting a running speed of the vehicle, i.e., a vehicle speed v. The vehicle speed sensor 72 is also connected to the CAN 70. Instead of detecting the vehicle speed v by the vehicle speed sensor 72, signals relating to the vehicle speed v from the brake system may pass through the CAN 70.

B. Control of Steering System

In the steering system according to the present embodiment, there are executed, as in ordinary steer-by-wire steering systems, a steering control of the wheel based on the steering operation with respect to the steering wheel 20 (hereinafter simply referred to as "steering control" where appropriate) and a control of the operation reaction force (hereinafter simply referred to as "reaction force control" where appropriate). In the steering system according to the present embodiment, there are further executed a supply current limiting process for limiting a supply current to the steering motor 50 and a supply current reducing process for forcibly reducing the supply current to the steering motor 50. Hereinafter, a basic steering control, the reaction force control, the supply current limiting process, and the supply current reducing process will be explained in this order, and a flow of each control will be briefly explained thereafter.

(a) Basic Steering Control

The steering control is a control for enabling the wheel 10 to be steered in accordance with the steering operation that is an operation with respect to the steering wheel 20. The steering control is executed by the steering ECU 62. The operating ECU 60 detects, as the operation amount of the operating member, the operation angle δ of the steering wheel 20 via the operation angle sensor 30. The steering ECU 62 determines a target steering angle θ* that is a target of the steering angle θ of the wheel 10 based on the operation angle δ obtained from the operating ECU 60 via the CAN 70, by multiplying the operation angle δ by a steering gear ratio γ, according to the following expression:

$$\theta = \gamma \cdot \delta$$

The steering ECU 62 detects, via the steering angle sensor 54, an actual steering angle θ of the wheel 10 (hereinafter referred to as "actual steering angle θ" where appropriate) that is an actual steering amount. Further, the steering ECU 62 determines a deviation of the actual steering angle θ with respect to the target steering angle θ*, i.e., a steering angle deviation Δθ, according to the following expression:

$$\Delta\theta = \theta^* - \theta$$

The steering ECU 62 determines a required steering torque Tqs that is the steering torque required for steering the wheel 10 to the target steering angle θ*, according to a feedback control law based on the steering angle deviation Δθ, namely, according to the following expression. In this respect, the first term, the second term, and the third term in the following expression are a proportional term, an integral term, and a derivative term, respectively, and "Gp", "Gi", and "Gd" in the following expression are a proportional term gain, an integral term gain, and a derivative term gain, respectively.

$$Tqs = Gp\cdot\Delta\theta + Gi\cdot\int\Delta\theta dt + Gd\cdot(d\Delta\theta/dt)$$

Based on the required steering torque Tqs determined as described above, the steering ECU 62 determines, according to the following expression, a target steering current Is* that is a target of a steering current Is supplied to the steering motor 50. In this respect, "Ks" in the following expression is a steering-current determining coefficient for determining the target steering current Is* based on the required steering torque Tqs.

$$Is^* = Ks\cdot Tqs$$

The steering ECU 62 supplies a current to the steering motor 50 based on the determined target steering current Is*.

(b) Reaction Force Control

The reaction force control is for giving, to the steering wheel 20, the reaction force torque that is the operation reaction force, to cause the driver to have an appropriate feeling with respect to the steering operation. The reaction force control is executed by the operating ECU 60. In the basic reaction force control, the operating ECU 60 determines a required reaction force torque Tqc that is the reaction force torque to be applied to the steering wheel 20, based on two components, i.e., a steering-torque-dependent component Tqcs and an operation-torque-dependent reduction component Tqco, according to the following expression:

$$Tqc = Tqcs - Tqco$$

The steering-torque-dependent component Tqcs is a component relating to the steering torque Tqs that is being actually generated for steering the wheel 10. As explained above, the actual steering torque Tqs is proportional to an actual steering current Is that is being actually supplied to the steering motor 50. Thus, the operating ECU 60 determines the steering-torque-dependent component Tqc according to the following expression. In this respect, the actual steering current Is is obtained based on information detected by the steering ECU 62 all the time and transmitted via the CAN 70. In the following expression, "Js" is a reaction-force-torque-component determining coefficient for determining the steering-torque-dependent component Tqcs.

$$Tqcs = Js\cdot Is$$

The operation-torque-dependent reduction component Tqco may be considered as a component for giving, to the driver, an operation feeling of what is called power steering. In the power steering, an assist torque corresponding to the operation torque Tqo is applied to the steering shaft 22. The operating ECU 60 determines the operation-torque-dependent reduction component Tqco according to the following expression, so as to simulate the assist torque. The operating ECU 60 utilizes, as the operation torque Tqo, the operation torque Tqo detected by the operation torque sensor 34 based on the torsional amount of the torsion bar 32. In the following expression, "Jo" is a reaction-force-torque-component determining coefficient for determining the operation-torque-dependent reduction component Tqco. The coefficient "Jo" is set so as to attain the operation feeling that as if a larger assist force is generated with an increase in the operation torque Tqo.

$$Tqco = Jo\cdot Tqo$$

Based on the required reaction force torque Tqc determined as described above, the operating ECU 60 determines, according to the following expression, a target reaction force current Ic* that is a target of a reaction force current Ic to be supplied to the reaction force motor 26. In the following expression, "Kc" is a reaction-force-current determining coefficient for determining the target reaction force current Ic* based on the required reaction force torque Tqc.

$$Ic^* = Kc\cdot Tqc$$

The operating ECU 60 supplies a current to the reaction force motor 26 based on the determined target reaction force current Ic*.

(c) Supply Current Limiting Process

For enabling the steering system to sufficiently exhibit its capability, it is preferable to allow a sufficiently large steering current Is to be supplied to the steering motor 50. In a case where the steering current Is is supplied to the steering motor 50 based on the target steering current Is* determined as described above, however, the target steering current Is* may be excessively large, resulting in an excessively large load on the steering motor 50. The steering ECU 62 of the steering system therefore limits the target steering current Is* to thereby limit the steering current Is in specific situations.

In the steering motion called stationary steering, a large steering force is required for steering the wheel 10 due to a large influence of a frictional force between a tire of the wheel and a road surface. In view of this fact, the steering ECU 62 limits the target steering current Is* to a relatively greater extent when the vehicle speed v is not lower than a set vehicle speed v0 while limits the target steering current Is* to a lesser extent when the vehicle speed v is lower than the set vehicle speed v0 in an attempt to ensure a sufficient steering motion. The set vehicle speed v0 is determined to be a speed at which the steering motion is identified as the stationary steering.

Figure 2:
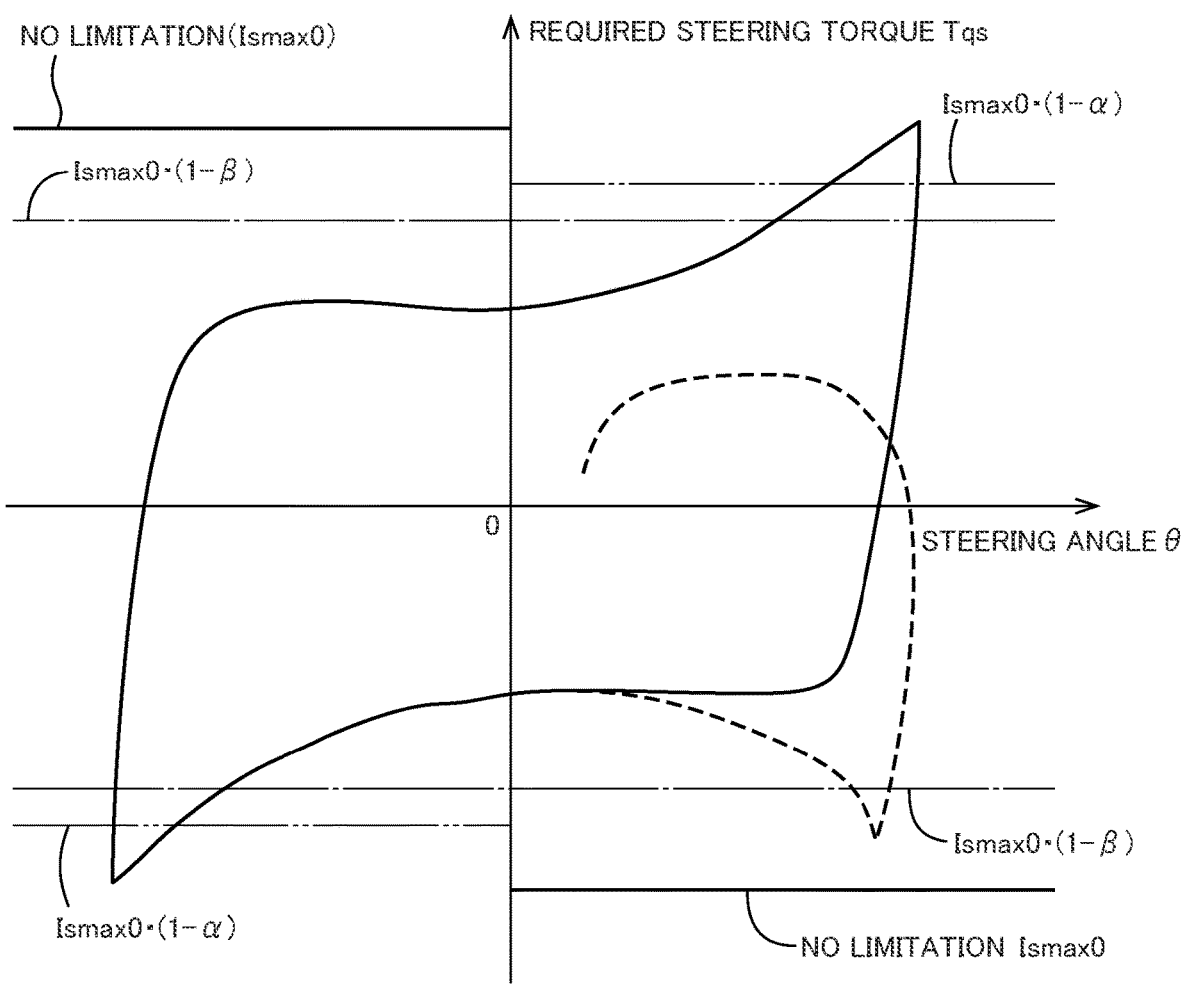
FIG. 2 is a graph representing a relationship between a steering amount and a steering force (steering torque)

The graph of FIG. 2 illustrates a change in the steering angle θ in the steering motion and a change in a force required for steering, i.e., a change in the required steering torque Tqs. For convenience sake, the required steering torque Tqs is represented such that the torque for steering the wheel 10 rightward is a positive value and the torque for steering the wheel 10 leftward is a negative value. The steering angle θ is represented as a positive value when the wheel 10 is steered rightward with respect to the neutral position and is represented as a negative value when the wheel 10 is steered leftward with respect to the neutral position. Accordingly, a first quadrant of this graph is a region in which the wheel 10 is being steered rightward such that the steering angle θ increases, namely, the steering-angle increasing motion is being performed. A second quadrant of the graph is a region in which the steering angle θ of the wheel 10 that is steered rightward is decreasing, namely, the steering-angle decreasing motion is being performed. A third quadrant of the graph is a region in which the wheel 10 is being steered leftward such that the steering angle θ increases. A fourth quadrant of the graph is a region in which the steering angle θ of the wheel 10 that is steered leftward is decreasing.

The solid line in the graph represents the change in the required steering torque Tqs with respect to the steering angle θ in the stationary steering state, namely, in the state in which the vehicle speed v is lower than the set vehicle speed v0. The dashed line in the graph represents the change in the required steering torque Tqs with respect to the steering angle when the wheel 10 is steered to a right-side steering end such that the steering angle θ increases in the state in which the wheel 10 is rotated at a certain speed, namely, in the state in which the vehicle speed v is not lower than the set vehicle speed v0, the vehicle speed v then becomes lower than the set vehicle speed v0 exactly at the steering end, and the steering-angle decreasing motion is subsequently performed.

As apparent from the solid line in the graph, even when the steering-angle increasing motion is switched to the steering-angle decreasing motion in the stationary steering state, the required steering torque Tqs is not so large at an initial stage of the steering-angle decreasing motion because the steering-angle decreasing motion is initiated in a state in which the tire remains deformed relatively largely. As apparent from the dashed line, in contrast, in the state in which the steering-angle increasing motion is performed when the vehicle speed v is not lower than the set vehicle speed v0 and the steering-angle decreasing motion is initiated from the time point when the vehicle speed v becomes lower than the set vehicle speed v0, the required steering torque Tqs at the initial stage of the steering-angle decreasing motion is large because the remaining deformation of the tire is relatively small at the initial stage. If the target steering current Is* is limited, namely, if a sufficient steering torque is not obtained, in the latter situation, the driver has a considerable unnatural feeling, unlike the case in which the target steering current Is* is limited in the steering-angle increasing motion. In view of this, when the steering-angle decreasing motion is performed in the stationary steering state, the limitation imposed on the supply current to the steering motor 50 is preferably made considerably small. In other words, it is preferable not to limit the supply current to the steering motor 50 when the steering-angle decreasing motion is performed in the stationary steering state.

In a case where a limitation ratio that is a degree of the limitation is defined as "ε(>0)", a maximum steering current Is that is allowed to be supplied to the steering motor 50 is defined as a maximum allowable current Ismax, and the maximum allowable current Ismax on which no limitation is imposed is defined as a non-limited maximum allowable current Ismax0, the steering ECU 62 of the present steering system determines the maximum allowable current Ismax according to the following expression:

$$Is\max = Is\max 0 \cdot (1-\varepsilon)$$

The limitation ratio ε is determined depending on situations in the following manner. As illustrated in the table of FIG. 3A, the steering ECU 62 determines the limitation ratio ε to be β(e.g., 15%) when the vehicle speed v is not lower than the set vehicle speed v0. In the case where the vehicle speed v is lower than the set vehicle speed v0, the steering ECU 62 determines the limitation ratio ε to be α(β, e.g., 10%) when the steering motion of the wheel 10 is not the steering-angle decreasing motion and determines the limitation ratio ε to be 0 when the steering motion of the wheel 10 is the steering-angle decreasing motion, so as not to limit the supply current to the steering motor 50. The limitations as described above are also illustrated schematically in FIG. 2.

Based on the thus determined maximum allowable current Ismax, the target steering current Is* is limited to the maximum allowable current Ismax in a case where the target steering current Is* determined as described above exceeds the maximum allowable current Ismax.

The limitation, which is imposed when the vehicle speed v is lower than the set vehicle speed v0 and the steering motion of the wheel 10 is the steering-angle decreasing motion, may be applied to only part of a steering range (that is a range defined by the right-side and left-side steering ends). Specifically, the limitation ratio ε may be determined to be 0 only when the steering angle θ (or the target steering angle θ*) is not less than a threshold steering angle θth so as not to impose the limitation on the supply current to the steering motor 50, and the limitation ratio ε may be determined to be a when the steering angle θ is less than the threshold steering angle θth. Though the threshold steering angle θth may be optionally set, the threshold steering angle θth may be set to the steering angle θ corresponding to about 60% from the neutral position in the steering range, for instance.

Instead of limiting the target steering current Is* based on the maximum allowable current Ismax that is determined utilizing the limitation ratio ε, the target steering current Is* may be directly limited utilizing the limitation ratio ε according to the following expression:

$$Is^* = Is^* \cdot (1-\varepsilon)$$

When the supply current to the steering motor 50 is limited as described above, the target steering current Is* may be possibly changed stepwise resulting from a stepwise change of the limitation ratio α The stepwise change of the target steering current Is* may lead to a stepwise change of the steering force, which may give an unnatural feeling to the driver. In the present steering system, therefore, the steering ECU 62 applies filter characteristics to the change of the limitation ratio α Specifically, when the limitation ratio ε is changed from one to another, the limitation ratio ε is changed continuously, and the maximum allowable current Ismax is thereby changed continuously, as illustrated in the graph of FIG. 3B. In other words, the limitation ratio ε is changed gradually, and the maximum allowable current Ismax is thereby changed gradually. The graph illustrates a state of the gradual change of the maximum allowable current Ismax when the limitation ratio ε is changed from 0 (i.e., when no limitation is imposed) to β.

When the supply current to the steering motor 50 is limited as described above, the limitation ratio ε is switched between a and 13 or between 0 and 13 depending on whether the vehicle speed v is higher than or lower than the set vehicle speed v0. In a state in which the vehicle speed v is kept at around the set vehicle speed v0, it is expected that the switchover of the imitation ratio ε frequently occurs. That is, a hunting phenomenon in the control may occur. To avoid the hunting phenomenon, the steering ECU 62 of the present steering system determines the set vehicle speed v0 such that the set vehicle speed v0 when the vehicle speed v is increasing and the set vehicle speed v0 when the vehicle speed v is decreasing are different from each other. That is, what is called hysteresis characteristics are applied to the change of the limitation ratio ε with respect to the change of the vehicle speed v. Specifically, as illustrated in the graph of FIG. 3C, the set vehicle speed v0 when the vehicle speed v is increasing is determined to be a first set vehicle speed v1, and the set vehicle speed v0 when the vehicle speed v is decreasing is determined to be a second set vehicle speed v2 that is lower than the first set vehicle speed v1. The graph illustrates a state in which the limitation ratio ε is switched between α and β.

(d) Supply Current Reducing Process

In a case where the state in which the vehicle speed v is lower than the set vehicle speed v0 and the steering-angle decreasing motion is being performed (hereinafter referred to as "steering-angle-decreasing stationary steering state" where appropriate) continues for a long length of time, there is a possibility that some failure is occurring. In such a case, the steering current Is will probably increase. Accordingly, in the steering-angle-decreasing stationary steering state, the steering ECU 62 of the present steering system forcibly reduces the current supplied to the steering motor 50, in other words, the steering ECU 62 forcibly reduces the target steering current Is*, to thereby reduce the load on the steering motor 50.

Specifically, the steering ECU 62 reduces the target steering current Is* when the actual steering current Is that is not less than a set current Islim is supplied for not less than a set length of time tlim in the steering-angle-decreasing stationary steering state. Further, the steering ECU 62 reduces the target steering current Is* when the board temperature T detected by the temperature sensor 64 is not lower than a threshold temperature Tth in the steering-angle-decreasing stationary steering state. In the steering-angle-decreasing stationary steering state, the steering ECU 62 calculates an actual-steering-current integrated value SumIs, which is an integrated value of the actual steering current Is. The steering ECU 62 reduces the target steering current Is* when the actual-steering-current integrated value SumIs is not less than the threshold integrated value SumIsth.

In reducing the target steering current Is*, the steering ECU 62 reduces the target steering current Is* to a set reduced value Is*red. The set reduced value Is*red is determined to be a value less than the maximum allowable current value Ismax0·(1−β) when the limitation ratio ε is β. The steering ECU 62 gradually reduces the target steering current Is* to avoid an abrupt change of the target steering current Is*.

(e) Control Flow

Figure 4:
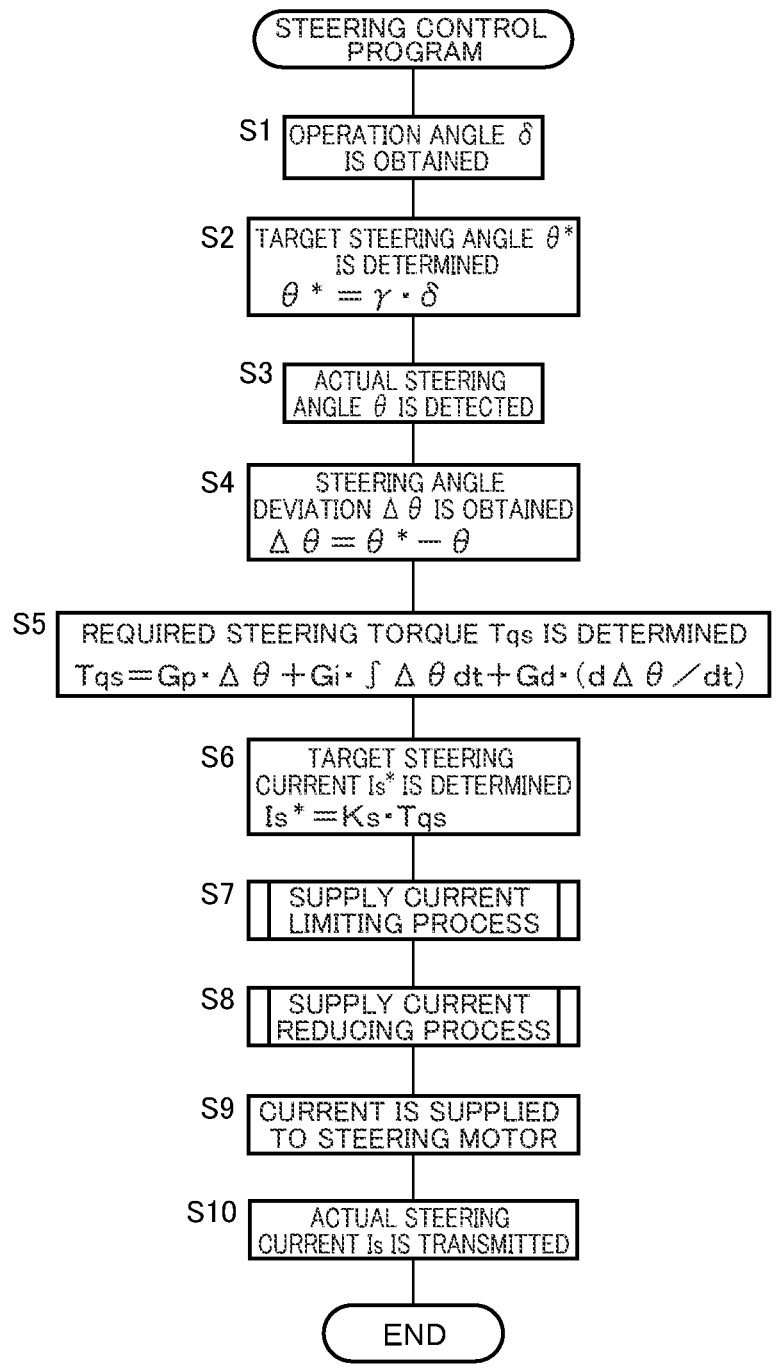
FIG. 4 is a flowchart of a steering control program executed by a controller.

The steering ECU 62 of the present steering system repeatedly executes a steering control program represented by a flowchart of FIG. 4 at a short time pitch, e.g., from several to several tens of milliseconds (msec), so that the steering control including the supply current limiting process and the supply current reducing process is executed. There will be hereinafter explained processing according to the program to briefly explain a flow of the steering control executed in the present steering system.

Information on the operation angle δ detected by the operation angle sensor 30 is transmitted from the operating ECU 60 to the steering ECU 62. In the processing according to the steering control program executed by the steering ECU 62, the operation angle δ is obtained at S1 based on the information. At S2, the target steering angle θ* is determined based on the operation angle δ and the steering gear ratio γ. At S3, the actual steering angle θ is detected via the steering angle sensor 54. At S4, the steering angle deviation Δθ is obtained based on the determined target steering angle θ* and the detected actual steering angle θ. At S5, the required steering torque Tqs is determined according to the feedback control law based on the steering angle deviation Δθ. At S6, the target steering current Is* is determined based on the required steering torque.

At S7, the supply current limiting process is executed for the determined target steering current Is*. At S8, the supply current reducing process is executed for the determined target steering current Is*. At S9, the current is supplied to the steering motor 50 based on the target steering current Is* that has been subjected to the processes. Because the actual steering current Is is detected, information on the actual steering current Is is transmitted at S10, and one execution of the processing according to the steering control program is ended.

Figure 5:
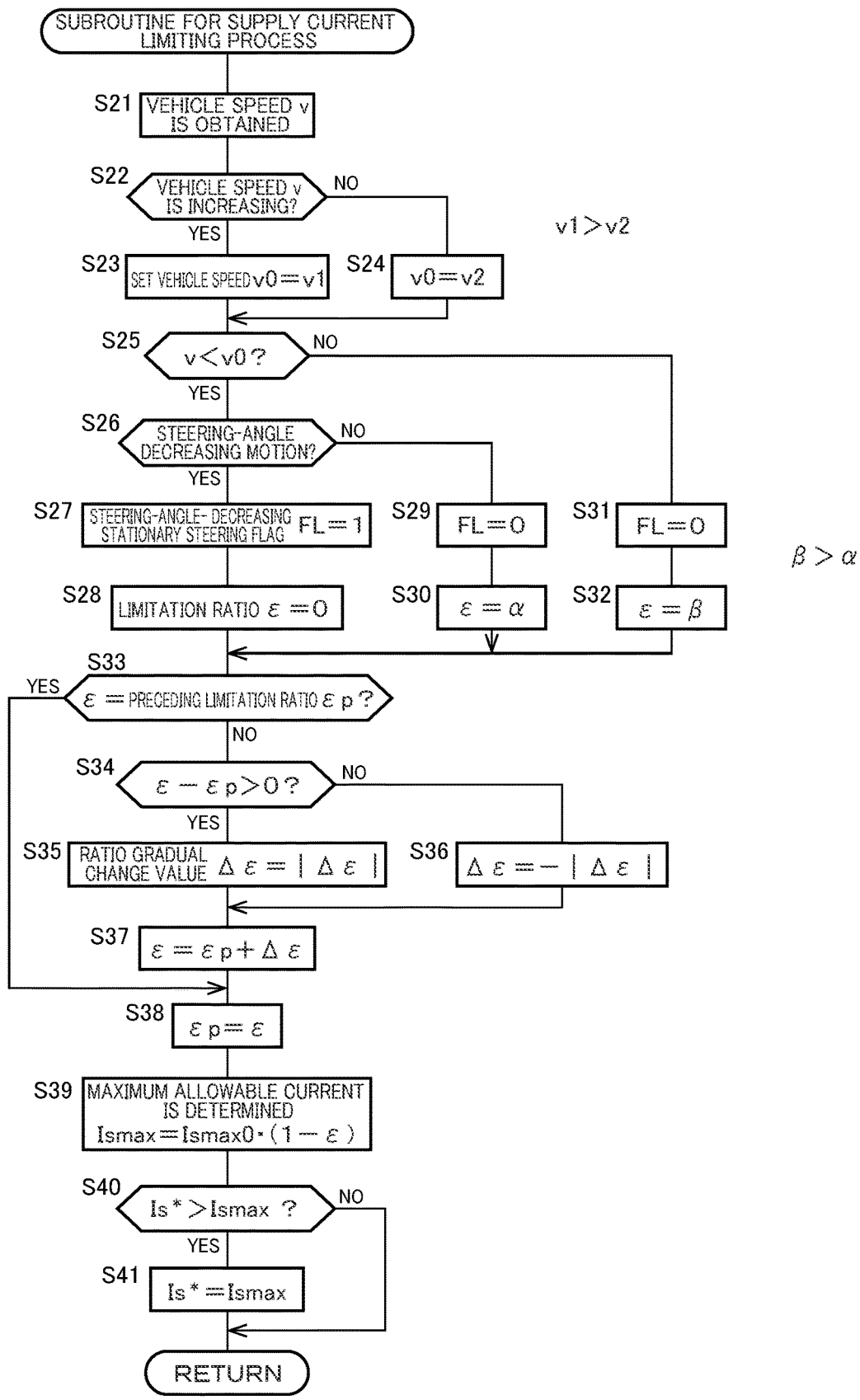
FIG. 5 is a flowchart of a subroutine for a supply current limiting process that constitutes part of the steering control program.

The supply current limiting process at S7 is executed by executing a subroutine for the supply current limiting process represented by a flowchart of FIG. 5. In the processing according to the subroutine, the vehicle speed v is obtained at S21. At S22, it is determined based on the obtained vehicle speed v whether the vehicle is in a speed increasing state, namely, whether the vehicle speed v is increasing. When the vehicle speed v is increasing, the control flow proceeds to S23 at which the set vehicle speed v0 for changing the limitation ratio ε is determined to be the first set vehicle speed v1. When the vehicle speed v is not increasing, the control flow proceeds to S24 at which the set vehicle speed v0 is determined to be the second set vehicle speed v2 lower than the first set vehicle speed v1.

At S25, it is determined whether the vehicle speed v is a speed at which the stationary steering is identified to be performed, in other words, it is determined whether the vehicle speed v is lower than the set vehicle speed v0. When the vehicle speed v is lower than the set vehicle speed v0, the control flow proceeds to S26 at which it is determined whether the steering motion is the steering-angle decreasing motion, in other words, whether the target steering angle θ* is decreasing. When the steering motion is the steering-angle decreasing motion, a steering-angle-decreasing stationary steering flag FL is set to "1" at S27, and the limitation ratio ε is determined to be 0 at S28. The steering-angle-decreasing stationary steering flag FL is a flag that is set to"1" when the vehicle speed v is lower than the set vehicle speed v0 and the target steering angle θ* is decreasing and that is set to "0" in situations other than that.

When it is determined at S26 that the steering motion is not the steering-angle decreasing motion, the control flow proceeds to S29 at which the steering-angle-decreasing stationary steering flag FL is set to "0", and the limitation ratio ε is set to αgreater than 0, at S30. When it is determined at S25 that the vehicle speed v is not lower than the set vehicle speed v0, the control flow proceeds to S31 at which the steering-angle-decreasing stationary steering flag FL is set to "0", and the limitation ratio ε is set to β greater than α, at S32.

It is then determined at S33 whether a preceding limitation ratio εp, which is the limitation ratio ε determined in the preceding execution of the program, is identical to the currently determined limitation ratio α If not identical, it is determined at S34 whether the limitation ratio ε has been increased or decreased. When it is determined that the limitation ratio ε has been increased, a ratio gradual change value Δε for gradually changing the limitation ratio ε is determined to be a positive value at S35. When it is determined that the limitation ratio ε has been decreased, the ratio gradual change value Δε is determined to be a negative value at S36. At S37, the ratio gradual change value Δε is added to the preceding limitation ratio εp, so that the limitation ratio ε is gradually changed. At S38, the currently determined limitation ratio ε is determined to be the preceding limitation ratio εp. When it is determined at S33 that the preceding limitation ratio εp and the currently determined limitation ratio are identical to each other, S34-S37 are skipped.

At S39, the maximum allowable current Ismax is determined based on the limitation ratio ε as explained above. It is determined at S40 whether the determined target steering current Is* is greater than the maximum allowable current Ismax. When the target steering current Is* is greater than the maximum allowable current Ismax, the target steering current Is* is determined to be the maximum allowable current Ismax at S41. That is, the target steering current Is* is limited. On the other hand, when the target steering current Is* is not greater than the maximum allowable current Ismax, S41 is skipped. Thus, the supply current limiting process is ended.

Figure 6A:
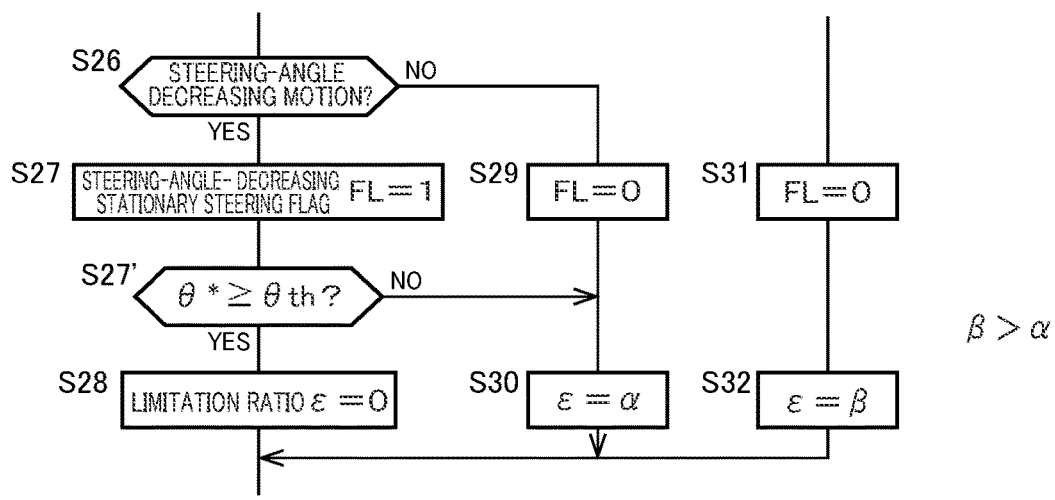
FIG. 6A is a flowchart of part of a subroutine for a supply current limiting process according to a modification.

For determining the limitation ratio ε to be 0 only when the target steering angle θ* is not lower than the threshold steering angle θth so as not to limit the supply current to the steering motor 50 and for determining the limitation ratio ε to be a when the target steering angle θ* is less than the threshold steering angle θth, part of the subroutine for the supply current limiting process may be constituted as illustrated in FIG. 6A. Specifically, after the determination at S27, determination at S27' may be added at which it is determined whether the target steering angle θ* is not less than the threshold steering angle θth. By adding S27', the limitation ratio ε is determined to be 0 at S28 when the target steering angle θ* is not less than the threshold steering angle θth. When the target steering angle θ* is less than the threshold steering angle θth, the limitation ratio ε is determined to be a at S30.

Figure 6B:
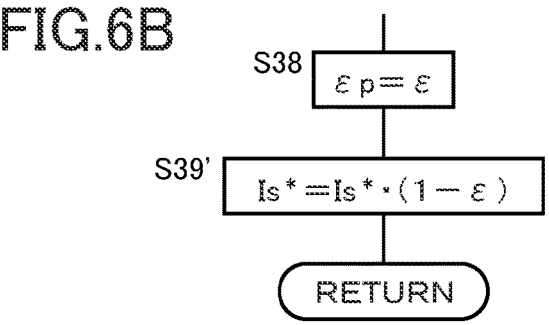
FIG. 6B is a flowchart of part of a subroutine for a supply current limiting process according to another modification.

For directly limiting the target steering current Is* utilizing the limitation ratio ε instead of limiting the target steering current Is* based on the maximum allowable current Ismax, part of the subroutine for the supply current limiting process may be constituted as illustrated in FIG. 6B. Specifically, S39' is implemented in place of S39-S41.

Figure 7:
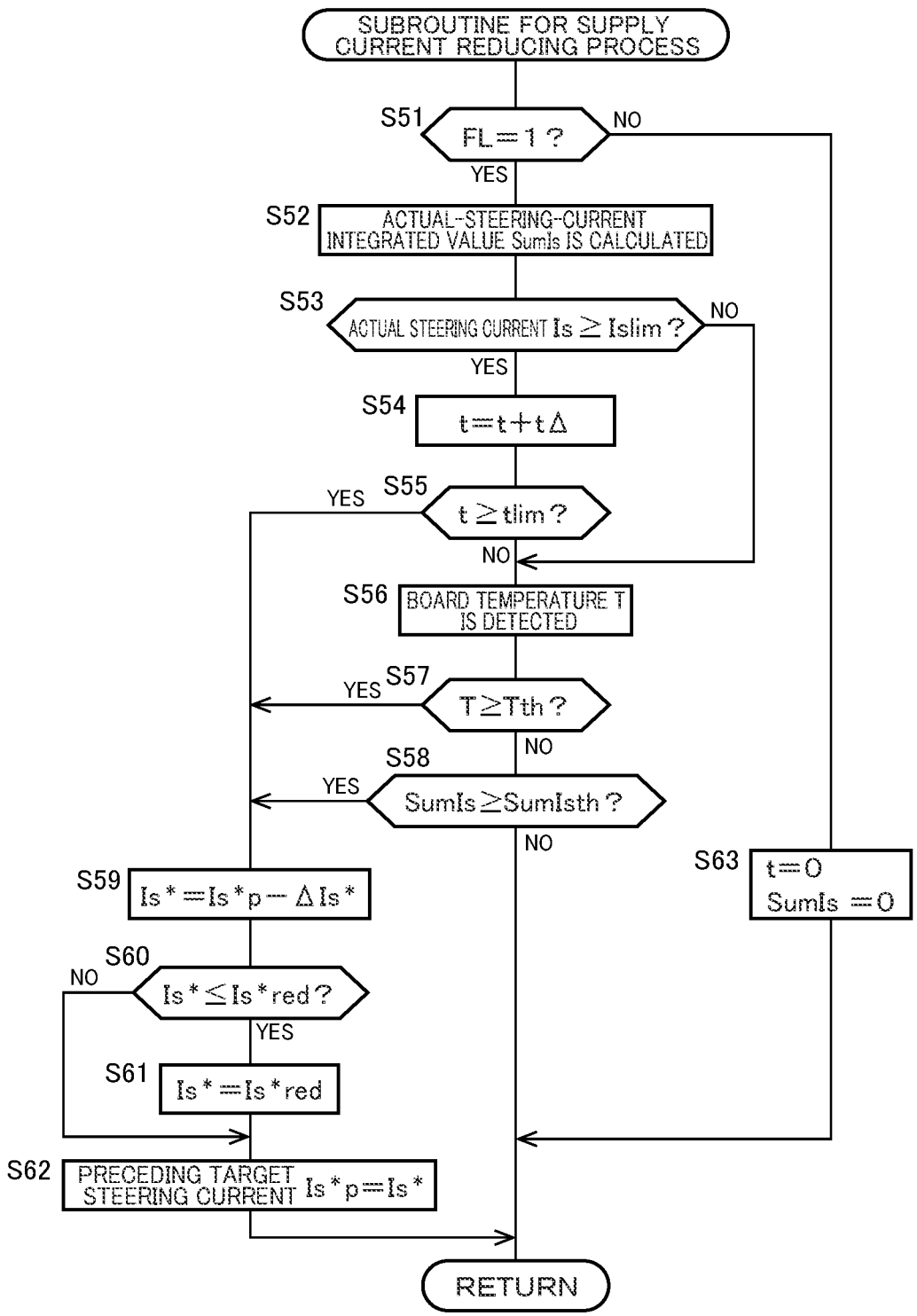
FIG. 7 is a flowchart of a subroutine for a supply current reducing process that constitutes part of the steering control program.

The supply current reducing process at S8 is executed by executing a subroutine for the supply current reducing process represented by a flowchart of FIG. 7. In the processing according to the subroutine, it is determined at S51 whether the steering-angle-decreasing stationary steering flag FL is "1". When the steering-angle-decreasing stationary steering flag FL is "1", the actual-steering-current integrated value SumIs is calculated at S52.

It is determined at S53 whether the actual steering current Is is not less than the set current Islim. When the actual steering current Is is not less than the set current Islim, the control flow proceeds to S54 at which a time counter t is incremented by a count-up value Δt that is equal to the pitch at which the program is executed. It is determined at S55 whether the time counter t has reached the set time tlim.

When the time counter t does not yet reach the set time tlim, the board temperature T is detected by the temperature sensor 64 at S56. It is determined at S57 whether the board temperature T is not lower than the threshold temperature Tth. When the board temperature T is lower than the threshold temperature Tth, it is determined at S58 whether the actual-steering-current integrated value SumIs is not less than the threshold integrated value SumIsth. When the actual-steering-current integrated value SumIs is less than the threshold integrated value SumIsth, the supply current reducing process is ended.

When it is determined at S55 that the time counter t has reached the set time tlim, when it is determined at S57 that the board temperature T is not lower than the threshold temperature Tth, or when it is determined at S58 that the actual-steering-current integrated value SumIs is not less than the threshold integrated value SumIsth, the control flow proceeds to S59 at which a reduction value ΔIs* is subtracted from the preceding target steering current Is*p, which is the target steering current Is* in the preceding execution of the program in the state in which the target steering current Is* is being decreased, so as to gradually reduce the target steering current Is*. At S60, it is determined whether the target steering current Is* is not greater than the set reduced value Is*red. When the target steering current Is* is not greater than the set reduced value Is*red, the target steering current Is* is made equal to the set reduced value Is*red at S61. When the target steering current Is is greater than the set reduced value Is*red, the target steering current Is* remains the value obtained by subtracting the reduction value ΔIs* as described above. At S62, the target steering current Is* is made equal to the preceding target steering current Is*p, and the supply current reducing process is ended.

When it is determined at S51 that the steering-angle-decreasing stationary steering flag FL is "0", the time counter t and the actual-steering-current integrated value SumIs are reset at S63, so that the target steering current Is* is not substantially reduced. Thus, the supply current reducing process is ended.

Figure 8:
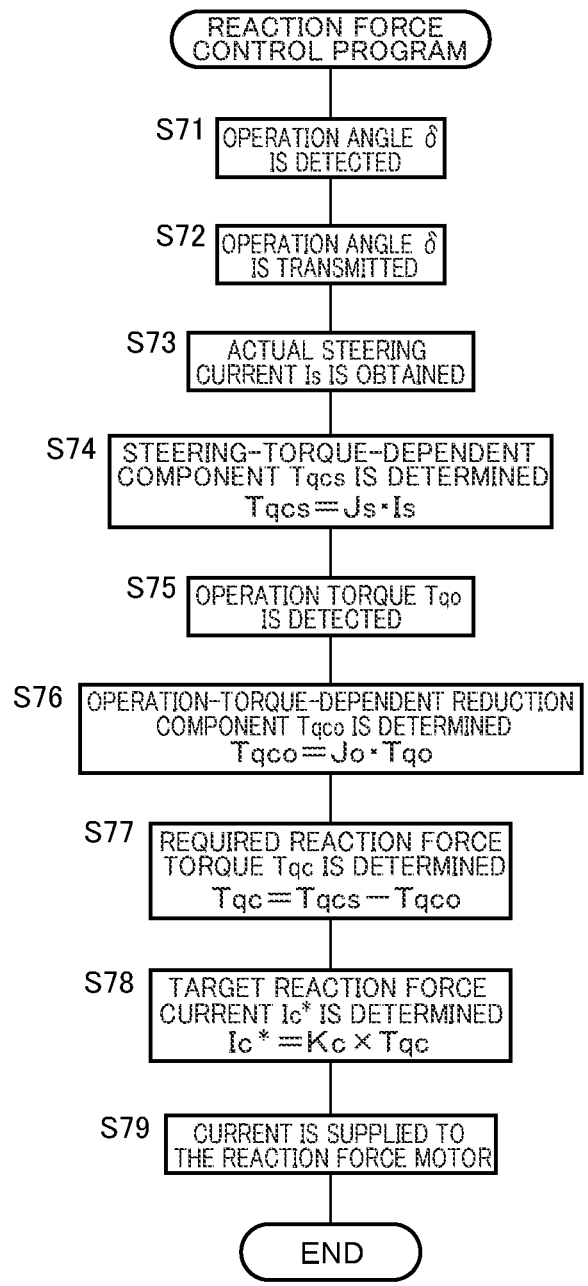
FIG. 8 is a flowchart of a reaction force control program executed by the controller.

The operating ECU 60 of the present steering system repeatedly executes a reaction force control program represented by a flowchart of FIG. 8 at a short time pitch, e.g., from several to several tens of milliseconds (msec), so that the reaction force control is executed. There will be hereinafter explained processing according to the program to briefly explain a flow of the reaction force control executed in the present steering system.

In the processing according to the reaction force control program, the operation angle δ is detected via the operation angle sensor 30 at S71. At S72, information on the operation angle δ is transmitted to the steering ECU 62.

At S73, the actual steering current Is is obtained based on the information transmitted from the steering ECU 62. At S74, the steering-torque-dependent component Tqcs is determined based on the actual steering current Is. At S75, the operation torque Tqo is detected via the operation torque sensor 34. At S76, the operation-torque-dependent reduction component Tqco is determined based on the operation torque Tqo. At S77, the required reaction force torque Tqc is determined by subtracting the operation-torque-dependent reduction component Tqco from the steering-torque-dependent component Tqcs.

At S78, the target reaction force current Ic* is determined based on the required reaction force torque Tqc. At S79, the current is supplied to the reaction force motor 26 based on the target reaction force current Ic*. Thus, one execution of the reaction force control program is ended.

What is claimed is:

1. A steer-by-wire steering system for a vehicle, comprising:
   an operating member operable by a driver;
   a steering device including an electric motor and configured to steer a wheel by a force generated by the electric motor;
   a controller configured to control the steering device,
   wherein the controller enables the wheel to be steered in accordance with an operation of the operating member while imposing limitation on a supply current to the electric motor,
   wherein the limitation imposed on the supply current to the electric motor is made smaller when a running speed of the vehicle is lower than a set speed and a steering motion of the wheel is a motion in a direction to decrease a steering amount than i) when the running speed of the vehicle is not lower than the set speed and ii) when the steering motion of the wheel is a motion in a direction to increase the steering amount, and wherein, when the running speed of the vehicle is lower than the set speed and the steering motion of the wheel is the motion in the direction to decrease the steering amount, the limitation imposed on the supply current to the electric motor is decreased to such a degree that the supply current is not limited at all.

2. The steer-by-wire steering system according to claim 1, wherein the set speed is determined to be a speed at which the steering motion, which is a motion called stationary steering, is identified to be performed.

3. The steer-by-wire steering system according to claim 1, wherein the set speed is not lower than 0.5 km/h and not higher than 5 km/h.

4. The steer-by-wire steering system according to claim 1,
wherein, when the running speed of the vehicle is lower than the set speed and the steering motion of the wheel is not the motion in the direction to decrease the steering amount, the limitation is increased to a certain degree, and wherein, when the running speed of the vehicle is not lower than the set speed, the limitation is further increased irrespective of whether the steering motion of the wheel is the motion in the direction to increase the steering amount.

5. The steer-by-wire steering system according to claim 1, wherein the supply current to the electric motor is reduced when a temperature of a board of a drive circuit for the electric motor is not lower than a threshold temperature in a state in which the running speed of the vehicle is lower than the set speed and the steering motion of the wheel is the motion in the direction to decrease the steering amount.

6. The steer-by-wire steering system according to claim 1, wherein the set speed when the running speed of the vehicle is increasing is different from the set speed when the running speed is decreasing.

7. The steer-by-wire steering system according to claim 1, wherein, when a degree of the limitation imposed on the supply current to the electric motor is changed, the degree is continuously changed.

8. A steer-by-wire steering system for a vehicle, comprising:
an operating member operable by a driver;
a steering device including an electric motor and configured to steer a wheel by a force generated by the electric motor;
a controller configured to control the steering device,
wherein the controller enables the wheel to be steered in accordance with an operation of the operating member while imposing limitation on a supply current to the electric motor,
wherein the limitation imposed on the supply current to the electric motor is made smaller when a running speed of the vehicle is lower than a set speed and a steering motion of the wheel is a motion in a direction to decrease a steering amount than i) when the running speed of the vehicle is not lower than the set speed and ii) when the steering motion of the wheel is a motion in a direction to increase the steering amount, and wherein, when the running speed of the vehicle is lower than the set speed and the steering motion of the wheel is the motion to decrease the steering amount, the limitation imposed on the supply current to the electric motor is decreased only when the steering amount of the wheel is not less than a set ratio with respect to a maximum steering amount.

9. A steer-by-wire steering system for a vehicle, comprising:
an operating member operable by a driver;
a steering device including an electric motor and configured to steer a wheel by a force generated by the electric motor;
a controller configured to control the steering device,
wherein the controller enables the wheel to be steered in accordance with an operation of the operating member while imposing limitation on a supply current to the electric motor,
wherein the limitation imposed on the supply current to the electric motor is made smaller when a running speed of the vehicle is lower than a set speed and a steering motion of the wheel is a motion in a direction to decrease a steering amount than i) when the running speed of the vehicle is not lower than the set speed and ii) when the steering motion of the wheel is a motion in a direction to increase the steering amount, and wherein the supply current to the electric motor is reduced when the supply current is kept higher than or equal to a set current for not less than a set length of time in a state in which the running speed of the vehicle is lower than the set speed and the steering motion of the wheel is the motion in the direction to decrease the steering amount.

10. A steer-by-wire steering system for a vehicle, comprising:
an operating member operable by a driver;
a steering device including an electric motor and configured to steer a wheel by a force generated by the electric motor;
a controller configured to control the steering device,
wherein the controller enables the wheel to be steered in accordance with an operation of the operating member while imposing limitation on a supply current to the electric motor,
wherein the limitation imposed on the supply current to the electric motor is made smaller when a running speed of the vehicle is lower than a set speed and a steering motion of the wheel is a motion in a direction to decrease a steering amount than i) when the running speed of the vehicle is not lower than the set speed and ii) when the steering motion of the wheel is a motion in a direction to increase the steering amount, and wherein the supply current to the electric motor is reduced when an integrated value of the supply current is not less than a threshold integrated value in a state in which the running speed of the vehicle is lower than the set speed and the steering motion of the wheel is the motion in the direction to decrease the steering amount.

* * * * *